US011312181B2

(12) United States Patent
Asano

(10) Patent No.: US 11,312,181 B2
(45) Date of Patent: Apr. 26, 2022

(54) PNEUMATIC TIRE

(71) Applicant: The Yokohama Rubber Co., LTD., Tokyo (JP)

(72) Inventor: Tomohiro Asano, Hiratsuka (JP)

(73) Assignee: The Yokohama Rubber Co., LTD.

( * ) Notice: Subject to any disclaimer, the term of this patent is extended or adjusted under 35 U.S.C. 154(b) by 676 days.

(21) Appl. No.: 16/091,094

(22) PCT Filed: Aug. 30, 2017

(86) PCT No.: PCT/JP2017/031115
§ 371 (c)(1),
(2) Date: Oct. 3, 2018

(87) PCT Pub. No.: WO2018/043545
PCT Pub. Date: Mar. 8, 2018

(65) Prior Publication Data
US 2019/0126687 A1   May 2, 2019

(30) Foreign Application Priority Data
Aug. 31, 2016 (JP) .............................. JP2016-170293

(51) Int. Cl.
*B60C 11/11* (2006.01)
*B60C 11/12* (2006.01)
(Continued)

(52) U.S. Cl.
CPC .......... *B60C 11/0302* (2013.01); *B60C 11/00* (2013.01); *B60C 11/03* (2013.01);
(Continued)

(58) Field of Classification Search
CPC ............. B60C 11/1236; B60C 11/1259; B60C 11/1392; B60C 11/1204; B60C 11/0302;
(Continued)

(56) References Cited

U.S. PATENT DOCUMENTS

| 5,287,905 A | 2/1994 | Caretta et al. |
| 5,679,186 A | 10/1997 | Tagashira et al. |

(Continued)

FOREIGN PATENT DOCUMENTS

| CN | 1608871 | 4/2005 |
| CN | 101181862 | 5/2008 |

(Continued)

OTHER PUBLICATIONS

Machine translation for Japan 2005-153812 (Year: 2020).*
(Continued)

*Primary Examiner* — Steven D Maki
(74) *Attorney, Agent, or Firm* — Thorpe North & Western

(57) ABSTRACT

In a pneumatic tire, a lug groove is configured so that a portion thereof defining a leading side of a block in a rotation direction is inclined toward a trailing side in the rotation direction as that portion extends outward in a lateral direction from an equator line side. Among small blocks defined in the block by narrow grooves, a small block adjacent to the lug groove defining the leading side of the block in a rotation direction, and to a circumferential main groove defining the equator line side is a leading-side block, and a small block with a portion positioned on a backmost side of the block in the rotation direction is a trailing-side block. Among the small blocks, the trailing-side block has a greater surface area than that of the leading-side block, and intermediate blocks each have a greater surface area than the trailing-side block.

19 Claims, 11 Drawing Sheets

(51) Int. Cl.
*B60C 11/13* (2006.01)
*B60C 11/03* (2006.01)
*B60C 11/00* (2006.01)

(52) U.S. Cl.
CPC .......... *B60C 11/0306* (2013.01); *B60C 11/12* (2013.01); *B60C 11/1204* (2013.01); *B60C 11/1236* (2013.01); *B60C 11/1259* (2013.01); *B60C 11/1307* (2013.01); *B60C 11/1392* (2013.01); *B60C 2011/0346* (2013.01); *B60C 2011/0369* (2013.01); *B60C 2011/1213* (2013.01); *B60C 2011/1245* (2013.01); *B60C 2011/1268* (2013.01); *B60C 2200/06* (2013.01)

(58) Field of Classification Search
CPC ......... B60C 11/1307; B60C 2011/1245; B60C 2011/1268; B60C 2011/1213
See application file for complete search history.

(56) References Cited

U.S. PATENT DOCUMENTS

| | | | |
|---|---|---|---|
| 6,474,381 | B1 | 11/2002 | Tsuda |
| D556,671 | S * | 12/2007 | Nonaka ........................ D12/567 |
| 2002/0092591 | A1 * | 7/2002 | Cortes ................. B60C 11/0309 152/209.18 |
| 2010/0252158 | A1 | 10/2010 | Haga |
| 2011/0220261 | A1 | 9/2011 | Matsuzawa |
| 2012/0267021 | A1 * | 10/2012 | Guichon ............. B60C 11/1392 152/209.24 |
| 2016/0152086 | A1 | 6/2016 | Kawakita |
| 2017/0282651 | A1 | 10/2017 | Suzuki et al. |
| 2019/0092102 | A1 * | 3/2019 | Iga ....................... B60C 11/1369 |
| 2019/0118581 | A1 * | 4/2019 | Suzuki ................ B60C 11/1236 |

FOREIGN PATENT DOCUMENTS

| | | |
|---|---|---|
| EP | 0 457 233 | 11/1991 |
| JP | 06-171319 A * | 6/1994 |
| JP | 08-040021 A * | 2/1996 |
| JP | H08-169215 | 7/1996 |
| JP | 2001-039121 | 2/2001 |
| JP | 2001-039123 | 2/2001 |
| JP | 2005-153812 A * | 6/2005 |
| JP | 2009-107471 | 5/2009 |
| JP | 4715890 | 7/2011 |
| JP | 2012-131265 | 7/2012 |
| JP | 2013-001325 | 1/2013 |
| JP | 5425802 | 2/2014 |
| JP | 2014-080112 | 5/2014 |
| JP | 2015-024818 | 2/2015 |
| JP | 2016-000575 | 1/2016 |
| WO | WO 2009/057663 | 5/2009 |
| WO | WO 2010/055659 | 5/2010 |
| WO | WO 2014/199708 | 12/2014 |
| WO | WO 2015/190524 | 12/2015 |
| WO | WO 2016/035659 | 3/2016 |

OTHER PUBLICATIONS

Machine translation for Japan 08-040021 (Year: 2020).*
Machine translation for Japan 06-171319 (Year: 2021).*
European Office Action for European Application No. 17846549.8 dated Feb. 26, 2020, 7 pages, Germany.
International Search Report for International Application No. PCT/JP2017/031115 dated Dec. 5, 2017, 4 pages, Japan.

* cited by examiner

| DESCRIPTION | CONVENTIONAL EXAMPLE | COMPARATIVE EXAMPLE | EXAMPLE 1 | EXAMPLE 2 | EXAMPLE 3 | EXAMPLE 4 | EXAMPLE 5 |
|---|---|---|---|---|---|---|---|
| CIRCUMFERENTIAL MAIN GROOVE HAS ZIGZAG SHAPE | NO | YES | YES | YES | YES | YES | YES |
| SMALL BLOCKS: THREE OR MORE WITH SURFACE AREAS IN THE ORDER OF LEADING SIDE < TRAILING SIDE < INTERMEDIATE | NO | NO | YES | YES | YES | YES | YES |
| SMALL BLOCK SURFACE AREA RATIO: LEADING SIDE < TRAILING SIDE < ALL INTERMEDIATE | NO | NO | NO | YES | YES | YES | YES |
| NARROW GROOVE DEPTH / CIRCUMFERENTIAL MAIN GROOVE DEPTH | 0.5 | 0.5 | 0.5 | 0.5 | 0.05 | 0.1 | 0.3 |
| POSITION OF OPENING PORTION OF LATERAL NARROW GROOVE FROM LEADING END OF BLOCK WITH RESPECT TO BLOCK LENGTH | 0.2 | 0.2 | 0.2 | 0.2 | 0.2 | 0.2 | 0.2 |
| NARROW GROOVE DEPTH: TWO OR MORE TYPES | NO | NO | NO | NO | NO | NO | NO |
| INCLINED GROOVE WALL OF LUG GROOVE ON LEADING SIDE IN TIRE ROTATION DIRECTION | NO | NO | NO | NO | NO | NO | NO |
| LUG GROOVE WITH CHAMFER | NO | NO | NO | NO | NO | NO | NO |
| PASS-BY NOISE PERFORMANCE | 100 | 102 | 103 | 103 | 103 | 103 | 103 |
| UNEVEN WEAR PERFORMANCE | 100 | 100 | 101 | 103 | 103 | 104 | 103 |
| TRACTION PERFORMANCE | 100 | 100 | 100 | 102 | 102 | 103 | 102 |

FIG. 10A

| DESCRIPTION | EXAMPLE 6 | EXAMPLE 7 | EXAMPLE 8 | EXAMPLE 9 | EXAMPLE 10 | EXAMPLE 11 |
|---|---|---|---|---|---|---|
| CIRCUMFERENTIAL MAIN GROOVE HAS ZIGZAG SHAPE | YES | YES | YES | YES | YES | YES |
| SMALL BLOCKS: THREE OR MORE WITH SURFACE AREAS IN THE ORDER OF LEADING SIDE < TRAILING SIDE < INTERMEDIATE | YES | YES | YES | YES | YES | YES |
| SMALL BLOCK SURFACE AREA RATIO: LEADING SIDE < TRAILING SIDE < ALL INTERMEDIATE | YES | YES | YES | YES | YES | YES |
| NARROW GROOVE DEPTH / CIRCUMFERENTIAL MAIN GROOVE DEPTH | 0.1 | 0.1 | 0.1 | 0.1 | 0.1 | 0.1 |
| POSITION OF OPENING PORTION OF LATERAL NARROW GROOVE FROM LEADING END OF BLOCK WITH RESPECT TO BLOCK LENGTH | 0.3 | 0.4 | 0.5 | 0.4 | 0.4 | 0.4 |
| NARROW GROOVE DEPTH: TWO OR MORE TYPES | NO | NO | NO | YES | YES | YES |
| INCLINED GROOVE WALL OF LUG GROOVE ON LEADING SIDE IN TIRE ROTATION DIRECTION | NO | NO | NO | NO | YES | YES |
| LUG GROOVE WITH CHAMFER | NO | NO | NO | NO | NO | YES |
| PASS-BY NOISE PERFORMANCE | 104 | 104 | 104 | 105 | 106 | 107 |
| UNEVEN WEAR PERFORMANCE | 104 | 104 | 105 | 105 | 106 | 106 |
| TRACTION PERFORMANCE | 103 | 104 | 104 | 105 | 105 | 105 |

FIG. 10B

PNEUMATIC TIRE

TECHNICAL FIELD

The present technology relates to a pneumatic tire.

BACKGROUND ART

In a pneumatic tire, in order to discharge water between a tread surface and a road surface during running on wet road surfaces, a plurality of grooves are formed in the tread surface. These grooves in the tread surface, however, cause noise and uneven wear when the vehicle run. Thus, among the pneumatic tires in the related art, there are tires that achieve reduced noise and uneven wear as a result of considerations made to a shape and an arrangement of the grooves.

For example, in the pneumatic tire described in Japan Patent No. 5425802, blocks of a so-called block pattern are each made into a polygon having six sides or more, and each other leading-side edges of the blocks of respective rows during the rolling of the tire under a load are provided with interval in a tread circumferential direction, thereby preventing the occurrence of large collision noise caused by a plurality of the blocks of the respective block rows simultaneously colliding with the road surface. Further, in the pneumatic tire described in Japan Patent No. 4715890, an open sipe that divides the block in a tire circumferential direction is formed in the blocks of the block pattern, and the open sipe is bent so as to include a lateral sipe portion where the open sipe extends in a tire lateral direction, and a circumferential sipe portion where the open sipe extends in the tire circumferential direction, the circumferential sipe portion being disposed in the middle of the lateral sipe portion, thereby suppressing abnormal wear and improving performance on snow and ice.

Here, in the block pattern, a trailing side of each block readily wears, causing a difference in a degree of wear between a leading side and a trailing side, increasing uneven wear susceptibility. While noise can be suppressed by shifting leading-side edges of blocks in the tread circumferential direction between different block rows as in Japan Patent No. 5425802, difficulties arise in suppressing the uneven wear caused by such a difference in the degree of wear between the leading side and the trailing side of each block. Further, while collision noise caused by the plurality of leading-side edges of the blocks simultaneously colliding with the road surface can be reduced by shifting the leading-side edges of the blocks in the tread circumferential direction between different block rows as in Japan Patent No. 5425802, such a shift does not lead to a reduction in noise from the perspective of an individual block.

Further, while uneven wear caused by a difference in the degree of wear between the leading side and the trailing side can be suppressed to a certain degree by bending open sipes provided in the blocks as in Japan Patent No. 4715890, the collision noise when the block collides with the road surface does not change, making the reduction of noise produced by each block difficult. Further, when open sipes are configured so that the circumferential sipe portion is positioned in the middle of the lateral sipe portion, the edge components in the tire circumferential direction are small with respect to the edge components in the tire lateral direction, and thus the edge effect may not be freely exhibited depending on the direction of the load that acts on a ground contact region of the tread surface on snow and ice. In this way, satisfaction of all of these, that is, uneven wear resistance, noise reduction, and performance on snow and ice, has been extremely difficult.

SUMMARY

The present technology provides a pneumatic tire capable of improving uneven wear resistance and reducing noise while maintaining performance on snow and ice.

A pneumatic tire according to the present technology has a specified rotation direction and includes: a tread surface, a plurality of circumferential main grooves formed on the tread surface and extending in a tire circumferential direction, a plurality of lug grooves formed on the tread surface and extending in a tire lateral direction, and a plurality of blocks, both sides of each of the blocks being defined by the lug grooves in the tire circumferential direction and at least one end portion of each of the blocks being defined by the circumferential main grooves in the tire lateral direction. The lug grooves are each configured with at least a portion thereof that defines a leading side of the block in a tire rotation direction inclined toward a trailing side in the tire rotation direction as that portion extends outward in a tire lateral direction from a tire equator line side. The blocks each include a narrow groove that opens to the circumferential main groove and the lug groove, and the block is defined into three or more small blocks by the narrow groove. The plurality of small blocks are configured so that, among the plurality of small blocks, the small block adjacent to the lug groove defining the leading side of the block in the tire rotation direction and to the circumferential main groove defining the tire equator line side of the block in the tire lateral direction is a leading-side block with a portion thereof positioned on a frontmost side of the block in the tire rotation direction, Among the plurality of small blocks, the small block with a portion thereof positioned on a backmost side of the block in the tire rotation direction is a trailing-side block, and the small block other than the leading-side block and the trailing-side block is an intermediate block. The plurality of small blocks are configured so that the trailing-side block has a surface area greater than that of the leading-side block, and the intermediate block has a surface area greater than that of the trailing-side block.

Further, in the pneumatic tire described above, preferably the blocks each includes a plurality of the intermediate blocks, and the plurality of intermediate blocks each have a surface area greater than those of the leading-side block and the trailing-side block.

Further, in the pneumatic tire described above, preferably the narrow groove has a groove depth d within a range from $0.05 \leq (d/D) \leq 0.3$ with respect to a groove depth D of the circumferential main groove.

Further, in the pneumatic tire described above, preferably the narrow groove opens to the circumferential main groove defining the tire equator line side of the block in the tire lateral direction, and a distance L1 in the tire circumferential direction from a portion positioned on the frontmost side of the block in the tire rotation direction to an opening portion that opens to the circumferential main groove is within a range from $0.2 \leq (L1/L) \leq 0.5$ with respect to a length L of the block in the tire circumferential direction.

Further, in the pneumatic tire described above, preferably the narrow groove includes a lateral narrow groove that extends in the tire lateral direction and opens to the circumferential main groove on at least on one end, and a circumferential narrow groove that extends in the tire circumferential direction and opens to the lug groove on at least one end, the lateral narrow groove and the circumferential narrow groove having mutually different groove depths.

Further, in the pneumatic tire described above, preferably the narrow groove includes a lateral narrow groove that extends in the tire lateral direction and opens to the circumferential main grooves on both ends, and a circumferential narrow groove that extends in the tire circumferential direction, opens to the lug groove on one end, and opens to the lateral narrow groove on the other end.

Further, in the pneumatic tire described above, preferably the lateral narrow groove has a groove depth that is greater than the groove depth of the circumferential narrow groove.

Further, in the pneumatic tire described above, preferably the small blocks are configured so that, among the plurality of small blocks, the small block adjacent to the lug groove defining the leading side of the block in the tire rotation direction includes a groove wall on the lug groove side that is inclined in a direction that causes a groove width of the lug groove to decrease as the groove wall extends from the opening portion side toward a groove bottom of the lug groove.

Further, in the pneumatic tire described above, preferably the blocks are each provided with a chamfer on each end portion on the tread surface side of the groove walls of the lug grooves defining both sides in the tire circumferential direction.

A pneumatic tire according to the present technology achieves the effect of reducing uneven wear resistance and noise while maintaining traction performance on snow and ice.

BRIEF DESCRIPTION OF DRAWINGS

FIG. 10A is a table showing the results of performance tests of pneumatic tires.

FIG. 10B is a table showing the results of performance tests of pneumatic tires.

DETAILED DESCRIPTION

Pneumatic tires according to embodiments of the present technology are described in detail below with reference to the drawings. However, the technology is not limited to these embodiments. Constituents of the following embodiments include elements that are essentially identical or that can be substituted or easily conceived by one skilled in the art.

Herein, "tire lateral direction" refers to the direction that is parallel with a rotation axis of a pneumatic tire. "Inward in the tire lateral direction" refers to the direction toward the tire equatorial plane in the tire lateral direction. "Outward in the tire lateral direction" refers to the direction opposite the direction toward the tire equatorial plane in the tire lateral direction. Further, "tire radial direction" refers to the direction orthogonal to the tire rotation axis. "Tire circumferential direction" refers to the direction of rotation with the tire rotation axis as the center of rotation.

Figure 1:
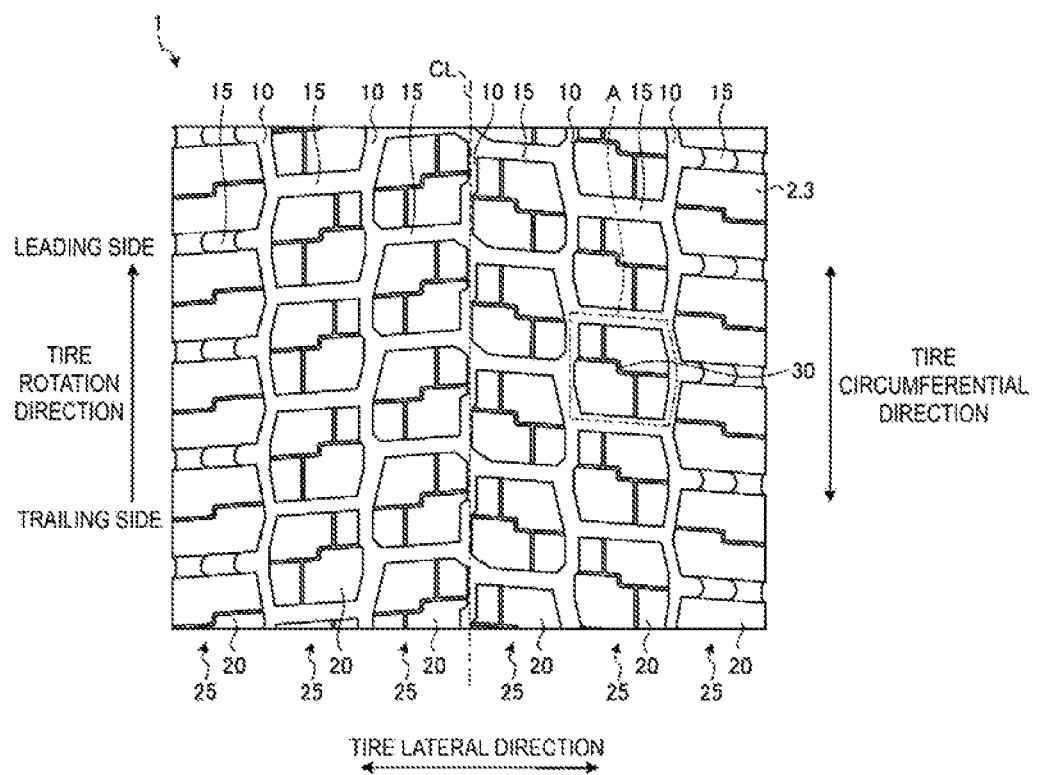
FIG. 1 is a plan view illustrating a tread surface of a pneumatic tire according to an embodiment.

FIG. 1 is a plan view of a tread surface of a pneumatic tire according to an embodiment of the present technology. A pneumatic tire 1 illustrated in FIG. 1 is provided with a tread portion 2 in an outermost portion in the tire radial direction. The surface of the tread portion 2, i.e., the portion that contacts the road surface when a vehicle (not illustrated) mounted with the pneumatic tire 1 runs, is formed as a tread surface 3. A plurality of circumferential main grooves 10 extending in the tire circumferential direction and a plurality of lug grooves 15 extending in the tire lateral direction are each formed in the tread portion 3, and a plurality of blocks 20 serving as land portions are formed by the circumferential main grooves 10 and the lug grooves 15. That is, the blocks 20 are defined by the lug grooves 15 on both sides in the tire circumferential direction, and by the circumferential main grooves 10 on at least one end portion in the tire lateral direction, and thus each of the blocks 20 has a substantially quadrangular shape.

Specifically, five circumferential main grooves 10 are formed aligned in the tire lateral direction, each of the five circumferential main grooves 10 are formed with repeated bending in the tire lateral direction while extending in the tire circumferential direction. That is, the circumferential main grooves 10 extending in the tire circumferential direction are formed in a zigzag shape. Further, the lug grooves 15 are configured so that the lug grooves 15 that do not penetrate the circumferential main grooves 10 and are adjacent to each other via the circumferential main grooves 10 are formed in positions that differ in the tire circumferential direction. The circumferential main grooves 10 here have a groove width within a range from 3 to 10 mm, both inclusive, and a groove depth within a range from 7 to 25 mm, both inclusive. Further, the lug grooves 15 here have a groove width within a range from 4 to 12 mm, both inclusive, and a groove depth within a range from 5 to 25 mm, both inclusive.

The blocks 20 defined by the circumferential main grooves 10 and the lug grooves 15 are disposed between circumferential main grooves 10 adjacent to each other as well as on the outer side in the tire lateral direction of each of the two circumferential main grooves 10 positioned most outward in the tire lateral direction. Further, a plurality of the blocks 20 positioned in substantially the same position in the tire lateral direction are aligned in series in the tire circumferential direction via the lug grooves 15, forming block rows 25 each in a row shape. Such a block row 25 is formed in four locations between five circumferential main grooves 10, and in two locations outward in the tire lateral direction of the two circumferential main grooves 10 positioned most outward in the tire lateral direction, forming six rows in total. These six block rows 25 are aligned in the tire lateral direction on the tread surface 3. The tread pattern on the tread surface 3 of the pneumatic tire 1 according to the present embodiment is thus a so-called block pattern provided with land portions formed by the plurality of blocks 20.

Further, the pneumatic tire 1 according to the present embodiment has a specified rotation direction when mounted on a vehicle. In the description below, a leading side in the tire rotation direction is the rotation direction side when the pneumatic tire 1 rotates in the specified direction and, is the side that first contacts and first separates from the road surface when the pneumatic tire 1 is mounted on a vehicle, rotated in the specified direction, and run. Further, a trailing side in the tire rotation direction is a side opposite to the rotation direction side when the pneumatic tire 1 rotates in the specified direction and, is the side that later contacts and separates from the road surface when the pneumatic tire 1 is mounted on a vehicle, rotated in the specified direction, and run. Each of the lug grooves 15 is inclined in a direction toward the trailing side in the tire rotation direction, as it goes from the tire equator line CL side to an outer side in the tire lateral direction. That is, the lug grooves 15 are each inclined in a direction toward the trailing side in the tire rotation direction, from an inner side toward the outer side in the tire lateral direction while extending in the tire circumferential direction. Note that the lug grooves 15 do not need to be inclined in the tire circumferential direction while extending in the tire lateral direction in all positions in which the lug grooves 15 define the blocks 20 in the tire circumferential direction. At least a portion of the lug grooves 15 that define the leading side of the blocks 20 in the tire rotation direction may be inclined in a direction toward the trailing side in the tire rotation direction, as it goes from the tire equator line CL side toward the outer side in the tire lateral direction.

Further, each of the blocks 20 of the six block rows 25 includes narrow grooves 30. In the four of the six block rows 25 other than the two rows outward in the tire lateral direction, the narrow grooves 30 open to the circumferential main grooves 10 and the lug grooves 15 that define each of the blocks 20. Further, in the two of the six block rows 25 outward in the tire lateral direction, the narrow grooves 30 open to the circumferential main groove 10 that defines each of the blocks 20 as well as to the outer sides of the blocks 20 in the tire lateral direction. Further, the narrow grooves 30 are each formed in substantially the same form in each of the blocks 20 of the four block rows 25 other than the two rows outward in the tire lateral direction, and in substantially the same form in each of the blocks 20 of the two block rows 25 outward in the tire lateral direction.

The narrow grooves 30 here each have a groove width within a range from 0.8 to 2 mm, both inclusive, and a groove depth within a range from 0.7 to 15 mm, both inclusive, and include a sipe. Here, "sipe" refers to a groove formed into a narrow shape in the tread surface 3. When the pneumatic tire 1 is mounted on a regular rim, inflated to a regular internal pressure, and placed under no load conditions, wall surfaces constituting the sipe do not come into contact with each other. When the sipe is positioned in a portion of a ground contact surface formed on a flat plate with a load applied in a vertical direction on the plate, or when the block 20 where the sipe is formed collapses, the wall surfaces constituting the sipe, or at least portions of areas disposed on the wall surfaces, come into contact with each other as a result of deformation of the block 20. Here, "regular rim" refers to a "standard rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO). "Regular internal pressure" refers to "maximum air pressure" defined by JATMA, a maximum value given in "Tire Load Limits at Various Cold Inflation Pressures" defined by TRA, or "Inflation Pressures" defined by ETRTO. The narrow grooves 30 in the present embodiment, even when positioned on the ground contact surface, maintain a state in which the groove walls are separated from each other, and include such a sipe.

Figure 2:
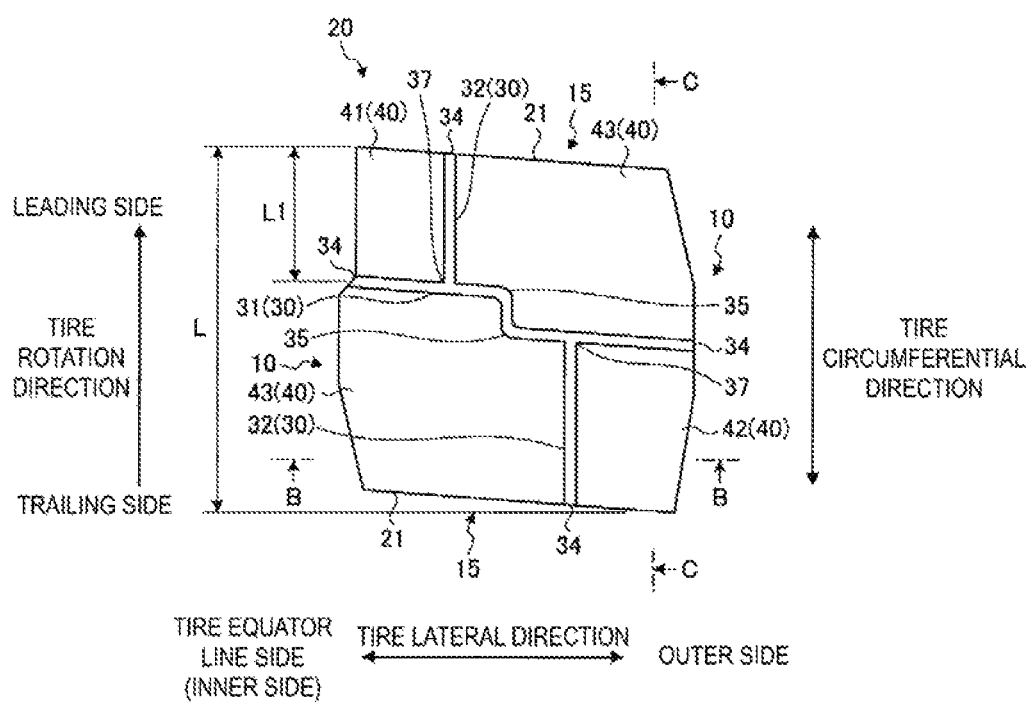
FIG. 2 is a detailed view of part A of FIG. 1.

FIG. 2 is a detailed view of part A of FIG. 1. The lug grooves 15 that define both sides of the block 20 in the tire circumferential direction incline in a direction toward the trailing side in the tire rotation direction, as it goes from the tire equator line CL side toward the outer side in the tire lateral direction, and thus an end portion on the tire equator line CL side in the tire lateral direction of the block 20 is positioned on a frontmost side in the tire rotation direction at an edge portion 21 on the leading side in the tire rotation direction. Further, at the edge portion 21 on the trailing side of the block 20 in the tire rotation direction, an end portion on the outer side in the tire lateral direction is positioned on the backmost side in the tire rotation direction.

Further, in the blocks 20 constituting the four block rows 25 other than the two block rows 25 positioned on both end sides in the tire lateral direction, the narrow grooves 30 include a lateral narrow groove 31 extending in the tire lateral direction, and circumferential narrow grooves 32 extending in the tire circumferential direction. The lateral narrow groove 31 of the narrow grooves 30 has at least one end that opens to the circumferential main grooves 10 defining the block 20. Further, the circumferential narrow grooves 32 have at least one end that opens to the lug grooves 15 defining the block 20.

Specifically, the lateral narrow groove 31 extending in the tire lateral direction is configured so that one end opens to the circumferential main groove 10 that defines the tire lateral direction CL side of the block 20 in the tire lateral direction, and another end opens to the circumferential main groove 10 that defines the outer side of the block 20 in the tire lateral direction. Both ends of the lateral narrow groove 31 thus form opening portions 34 that respectively open to the circumferential main grooves 10.

Further, the lateral narrow groove 31 bends at two locations while extending in the tire lateral direction, and includes two bent portions 35. The two bent portions 35 bend in directions such that the portion of the lateral narrow groove 31 positioned outward from the bent portion 35 in the tire lateral direction is positioned further to the trailing side in the tire rotation direction than the portion of the lateral narrow groove 31 positioned inward from the bent portion 35 in the tire lateral direction. These two bent portions 35 are positioned in a central region of the block 20 in the tire lateral direction at different positions in the tire circumferential direction, and the portion of the lateral narrow groove 31 between the bent portions 35 extends in the tire circumferential direction at a short length. In other words, the lateral narrow groove 31 bends at the two bent portions 35, forming a so-called crank-like shape.

Further, two of the circumferential narrow grooves 32 are provided, and these two circumferential narrow grooves 32 are positioned further outward of the block 20 in the tire lateral direction than the bent portions 35 of the lateral narrow groove 31. That is, one circumferential narrow groove 32, of the two circumferential narrow grooves 32, is positioned inward from the bent portions 35 in the tire lateral direction, and the other circumferential narrow groove 32 is positioned outward from the bent portions 35 in the tire lateral direction. The circumferential narrow groove 32, of the two circumferential narrow groove 32, positioned inward from the bent portions 35 in the tire lateral direction is positioned on the leading side of the lateral narrow groove 31 in the tire rotation direction, and the circumferential narrow groove 32 positioned outward from the bent portions 35 in the tire lateral direction is positioned on the trailing side of the lateral narrow groove 31 in the tire rotation direction.

The circumferential narrow grooves 32, at these positions, are each configured so that one end opens to the lug groove 15, and the other end intersects the lateral narrow groove 31, connecting and opening to the lateral narrow groove 31. Specifically, the circumferential narrow groove 32 positioned inward from the bent portions 35 in the tire lateral direction is configured so that an end portion on the leading side in the tire rotation direction is an opening portion 34 that opens to the lug groove 15, and an end portion on the trailing side in the tire rotation direction is connected to the lateral narrow groove 31. Further, the circumferential narrow groove 32 positioned outward from the bent portions 35 in the tire lateral direction is configured so that an end portion on the trailing side in the tire rotation direction is an opening portion 34 that opens to the lug groove 15, and an end portion on the leading side in the tire rotation direction is connected to the lateral narrow groove 31.

A portion where the circumferential narrow groove 32 and the lateral narrow groove 31 intersect form an intersection point 37, and the narrow grooves 30 include two intersection points 37 formed by the two circumferential narrow grooves 32 intersecting one lateral narrow groove 31. That is, the narrow grooves 30 is configured to include two intersection points 37 by two circumferential narrow grooves 32 being provided as one of the narrow grooves 30, the two circumferential narrow grooves 32 intersecting the lateral narrow groove 31, which is another narrow groove 30. The bent portions 35 of the lateral narrow groove 31 are positioned between the two intersection points 37 in the tire lateral direction.

Further, in the narrow grooves 30, a distance L1 in the tire circumferential direction from a portion positioned on the frontmost side of the block 20 in the tire rotation direction to the opening portion 34 that opens to the circumferential main groove 10 that defines the tire equator line CL side is within a range from $0.2 \le (L1/L) \le 0.5$ with respect to a length L of the block 20 in the tire circumferential direction. That is, the opening portion 34 of the narrow groove 30 that opens to the circumferential main groove 10 that defines the tire equator line CL side opens to the circumferential main groove 10 at a position on the leading side from a center of the block 20 in the tire rotation direction. Note that the lug grooves 15 that define both sides of the block 20 in the tire circumferential direction incline in the tire circumferential direction with respect to the tire lateral direction, and thus the length L of the block 20 in this case is a distance between portions on both sides of the block 20 in the tire circumferential direction that are farthest apart in the tire circumferential direction.

Further, the block 20 is configured so that, at the edge portion 21 on the leading side in the tire rotation direction, the end portion on the tire equator line CL side in the tire lateral direction is positioned on the frontmost side in the tire rotation direction, and thus the distance L1 is the distance in the tire circumferential direction between the end portion on the tire equator line CL side of the edge portion 21 on the leading side in the tire rotation direction, and the opening portion 34 that opens to the circumferential main groove 10 that defines the tire equator line CL side. The narrow groove 30 opens to the circumferential main groove 10 with the distance L1 from a leading end of the block 20 in the tire rotation direction to the opening portion 34 that opens to the circumferential main groove 10 that defines the tire equator line CL side being within a range from 20 to 50%, both inclusive, with respect to the length L of the block 20 in the tire circumferential direction. Note that the position of the opening portion 34 in this case is a center position of an opening width of the opening portion 34 in the tire circumferential direction. Further, the relationship between the distance L1 in the tire circumferential direction to the opening portion 34 that opens to the circumferential main groove 10 on the tire equator line CL side and the length L of the block 20 in the tire circumferential direction is preferably within a range from $0.3 \le (L1/L) \le 0.4$.

Figure 3:
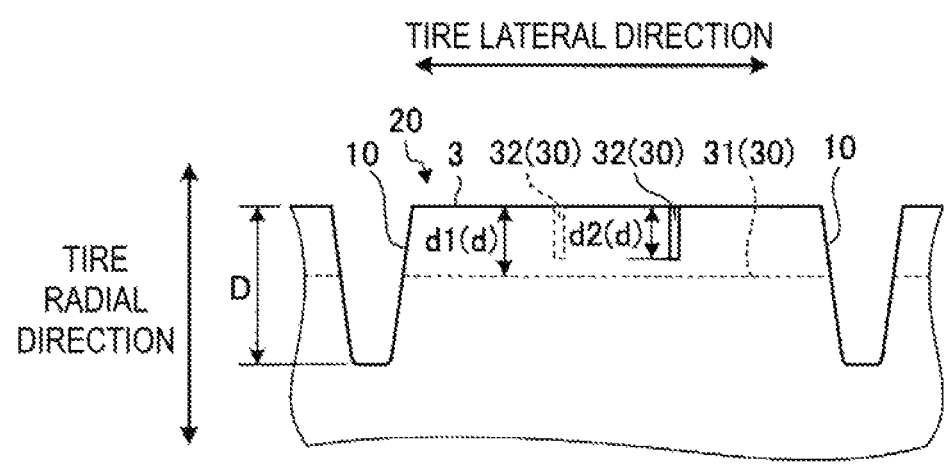
FIG. 3 is a cross-sectional view taken along B-B of FIG. 2.

FIG. 3 is a cross-sectional view taken along B-B of FIG. 2. The narrow grooves 30 have a groove depth d within a range from $0.05 \le (d/D) \le 0.3$ with respect to a groove depth D of the circumferential main groove 10. The groove depth d of the narrow grooves 30 is preferably within a range from $0.1 \le (d/D) \le 0.2$ with respect to the groove depth D of the circumferential main groove 10. Further, the narrow grooves 30 each have two or more groove depths and, in the present embodiment, the groove depths differ in the lateral narrow groove 31 and the circumferential narrow groove 32 of the narrow grooves 30. Specifically, a groove depth d1 of the lateral narrow groove 31 is greater than a groove depth d2 of the circumferential narrow groove 32, and the groove depth d2 of the circumferential narrow groove 32 is within a range from $0.5 \le (d2/d1) \le 0.9$ with respect to the groove depth d1 of the lateral narrow groove 31.

The block 20 is defined into three or more small blocks 40 by the narrow grooves 30. That is, the lateral narrow groove 31 and the circumferential narrow grooves 32 of the narrow grooves 30 are connected to the circumferential main grooves 10 and the lug grooves 15, and the lateral narrow groove 31 and the circumferential narrow grooves 32 are connected to each other. Thus, the blocks 20 are divided into a plurality of regions in a plan view by the narrow grooves 30, each region being a small block 40. According to the present embodiment, four small blocks 40 are formed in each of the blocks 20. That is, the blocks 20 are each separated in the tire circumferential direction by the lateral narrow grooves 31, and each of the regions separated in the tire circumferential direction are further separated in the tire lateral direction by the circumferential narrow grooves 32, thereby defining the block 20 into four of the small blocks 40.

Of these four small blocks 40, the small block 40 adjacent to the lug groove 15 that defines the leading side of the block 20 in the tire rotation direction and to the circumferential main groove 10 that defines the tire equator line CL side of the block 20 in the tire lateral direction is a leading-side block 41 that includes a portion of the block 20 positioned on the frontmost side in the tire rotation direction.

That is, when the tread surface 3 of the pneumatic tire 1 contacts the road surface, contact is made from the portion relatively positioned on the leading side in the tire rotation direction and thus, in each of the blocks 20 as well, contact is made from the leading side in the tire rotation direction. Further, when the block 20 in contact with the ground separates from the road surface, separation is gradually made from the leading side to the trailing side in the tire rotation direction, with the portion positioned on the backmost side in the tire rotation direction separating last. As a result, during rotation of the pneumatic tire 1, each of the blocks 20 contacts the road surface first at a leading end in the tire rotation direction, bites into the road surface first at a leading end, then contacts the road surface at the very end of the trailing end in the tire rotation direction, and kicks off the road surface at the trailing end.

Furthermore, in the pneumatic tire 1 according to the present embodiment, at the edge portion 21 on the leading side of the block 20 in the tire rotation direction, an end portion on the tire equator line CL side in the tire lateral direction is positioned on the frontmost side in the tire rotation direction. Thus, of the four small blocks 40, the small block 40 adjacent to the lug groove 15 that defines the leading side of the block 20 in the tire rotation direction, and to the circumferential main groove 10 that defines the tire equator line CL side of the block 20 in the tire lateral direction is the small block 40 defined as the leading-side block 41 that first contacts the ground during rotation of the pneumatic tire 1.

In contrast, of the four small blocks 40, the small block 40 that includes a portion of the block 20 positioned on the backmost side in the tire rotation direction is a trailing-side block 42. That is, at the edge portion 21 on the trailing side of the block 20 in the tire rotation direction, an end portion on the outer side in the tire lateral direction is positioned on the backmost side in the tire rotation direction. Thus, of the four small blocks 40, the small block 40 adjacent to the lug groove 15 that defines the trailing side of the block 20 in the tire rotation direction, and to the circumferential main groove 10 that defines the outer side of the block 20 in the tire lateral direction is the small block 40 defined as the trailing-side block 42 that last separates from the road surface during rotation of the pneumatic tire 1.

Further, of the four small blocks 40, the two small blocks 40 other than the two small blocks 40 of the leading-side block 41 and the trailing-side block 42 are intermediate blocks 43. That is, of the four small blocks 40, the small block 40 adjacent to the lug groove 15 that defines the leading side of the block 20 in the tire rotation direction and to the circumferential main groove 10 that defines the outer side in the tire lateral direction, as well as the small block 40 adjacent to the lug groove 15 that defines the trailing side of the block 20 in the tire rotation direction and to the circumferential main groove 10 that defines the tire equator line CL side in the tire lateral direction are both intermediate blocks 43.

The small blocks 40 thus formed have surface areas in the plan view of the block 20 configured so that the surface area of the trailing-side block 42 is greater than that of the leading-side block 41, and the surface areas of the intermediate blocks 43 are each greater than that of the trailing-side block 42. Further, the surface areas of the two intermediate blocks 43 are each greater than those of the leading-side block 41 and the trailing-side block 42. That is, the surface areas of the four small blocks 40 increase in the order of the leading-side block 41<the trailing-side block 42<the intermediate blocks 43 (both).

Note that the surface area of the leading-side block 41 is preferably within a range from 8 to 20%, both inclusive, of the surface area of the block 20, and the surface area of the trailing-side block 42 is preferably within a range from 12 to 30%, both inclusive, of the block 20. Further, the two intermediate blocks 43 may have a relative relationship such that one of the surface areas of the two is greater than the other, as long as the surface areas of both are greater than those of the leading-side block 41 and the trailing-side block 42, any relative relationship between the two intermediate blocks 43 is not limited.

Furthermore, the blocks 20 are configured so that a combined surface area of the two small blocks 40 positioned on the trailing side of the lateral narrow groove 31 in the tire rotation direction is greater than a combined surface area of the two small blocks 40 positioned on the leading side of the lateral narrow groove 31 in the tire rotation direction. Specifically, in the block 20, preferably the combined surface area of the two blocks 40 positioned on the leading side of the lateral narrow groove 31 in the tire rotation direction is within a range from 30 to 50%, both inclusive, of the surface area of the block 20.

Figure 4:
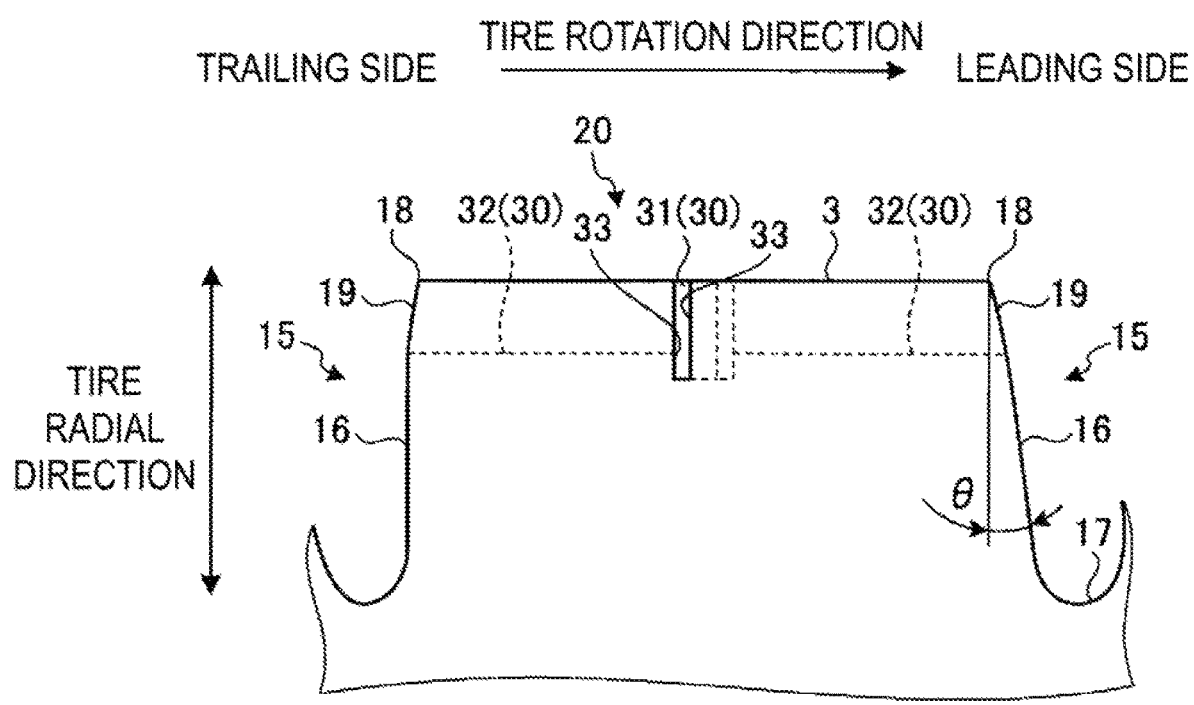
FIG. 4 is a cross-sectional view taken along C-C of FIG. 2.

FIG. 4 is a cross-sectional view taken along C-C of FIG. 2. Among the four small blocks 40, the small block 40 adjacent to the lug groove 15 defining the leading side of the block 20 in the tire rotation direction includes a groove wall 16 on the lug groove 15 side that is inclined in a direction that causes a groove width of the lug groove 15 to decrease as the groove wall 16 extends from an opening portion 18 side toward a groove bottom 17 of the lug groove 15. In other words, the groove wall 16 of the lug groove 15 constituting the surface of the small block 40 on the leading side in the tire rotation direction is inclined with respect to the tire radial direction in the direction toward the leading side in the tire rotation direction as the groove wall 16 extends from the opening portion 18 side toward the groove bottom 17 side of the lug groove 15. An inclination angle θ with respect to the tire radial direction of this groove wall 16 of the lug groove 15 is preferably from 5° to 15°, both inclusive.

In contrast to the lug groove 15 defining the leading side of the block 20 in the tire rotation direction including the groove wall 16 thus inclined with respect to the tire radial direction, the lug groove 15 defining the trailing side of the block 20 in the tire rotation direction includes the groove wall 16 that forms an angle in substantially the tire radial direction. Further, the narrow grooves 30 that define the small blocks 40 are similarly configured so that a groove wall 33 is formed at an angle substantially in the tire radial direction.

Furthermore, the blocks 20 are each provided with a chamfer 19 on each end portion on the tread surface 3 side of the groove walls 16 of the lug grooves 15 defining both sides in the tire circumferential direction. This chamfer 19 is formed into a gently curved surface by the slight removal of a portion of the groove wall 16 of the lug groove 15 near the tread surface 3.

In the blocks 20 of the four of the six block rows 25 other than the two block rows 25 positioned on both end sides in the tire lateral direction, the narrow grooves 30 are formed in the form described above, defining each of the blocks 20 into four of the small blocks 40. Further, in the blocks 20 of the two of the six block rows 25 positioned on both end sides in the tire lateral direction, only the lateral narrow groove 31 is formed as the narrow groove 30 and not the circumferential narrow groove 32.

The pneumatic tire 1 according to the present embodiment thus configured is applied to a heavy duty pneumatic tire. When mounted on a vehicle, the pneumatic tire 1 is mounted on a rim wheel and then mounted with the rim on the vehicle in an inflated state. The pneumatic tire 1 mounted on the rim wheel is mounted on a large vehicle such as a truck or a bus, for example.

When a vehicle with the pneumatic tire 1 mounted thereon runs, the pneumatic tire 1 rotates while the tread surface 3 of the tread surface 3 located at the bottom contacts the road surface. When a vehicle with the pneumatic tire 1 mounted thereon run on dry road surfaces, the vehicle mainly run by a friction force between the tread surface 3 and the road surface. This friction force transmits a driving force and a braking force to the road surface and generates a swivel force. Further, when the vehicle runs on wet road surfaces, the vehicle runs while water between the tread surface 3 and the road surface enters the circumferential main grooves 10, the lug grooves 15, and the like, and is discharged by these grooves. In this way, the tread surface 3 readily contacts the road surface, allowing the vehicle to run by the friction force between the tread surface 3 and the road surface.

Further, when the vehicle runs on icy and snowy road surfaces, the edges serving as boundary portions between the tread surface 3 and the grooves get caught on the icy and snowy road surfaces, making it possible to produce resistance between the tread surface 3 and the icy and snowy road surfaces and generate traction. Additionally, in the pneumatic tire 1 according to the present embodiment, the narrow grooves 30 are formed in the blocks 20, dividing the blocks 20 into the small blocks 40. Accordingly, the number of edge components of each of the blocks 20 increases and the number of edge components of the tread surface 3 in its entirety increases, making it possible to ensure traction performance as well as performance on snow and ice during running on icy and snowy road surfaces.

Further, the pneumatic tire 1 according to the present embodiment has a specified rotation direction and, among the plurality of small blocks 40 of the blocks 20, the leading-side block 41 has the smallest surface area. The leading-side block 41 is the small block 40 that first contacts the ground upon ground contact by the block 20. With this leading-side block 41 having the smallest surface area, a hitting sound at the time of contact can be reduced. That is, when the block 20 separated from the road surface contacts the road surface, the hitting sound produced when the block 20 makes contact tends to increase in volume in proportion to an increase in the surface area of the block 20. Thus, with the surface area of the leading-side block 41 that first contacts the ground upon ground contact by the block 20 being the smallest, the production of a loud hitting sound at the time of contact can be suppressed.

Furthermore, when the tread surface 3 contacts the road surface, a ground contact pressure in a central region in the tire lateral direction of the ground contact region increases. As a result, a loud hitting sound is readily produced when the region on the tire equator line CL side in the tire lateral direction contacts the ground during ground contact by each of the blocks 20. In contrast, in the pneumatic tire 1 according to the present embodiment, the small block 40 adjacent to the circumferential main groove 10 defining the block 20 on the tire equator line CL side defined as a leading-side block 41 has the smallest surface area, thereby making it possible to effectively reduce the hitting sound when the region that has high ground contact pressure and readily produces a loud hitting sound upon ground contact contacts the ground. In this way, the noise produced when the tread surface 3 contacts the road surface during rotation of the pneumatic tire 1 can be reduced.

Further, among the small blocks 40, the trailing-side block 42 has a greater surface area than that of the leading-side block 41, and the intermediate block 43 has a greater surface area than that of the trailing-side block 42, making it possible to make the surface area of the small blocks 40 positioned on the trailing side of the lateral narrow groove 31 in the tire rotation direction greater than that of the small blocks 40 positioned on the leading side. Accordingly, slippage on the trailing side of the block 20 in the tire rotation direction can be suppressed, and heal and toe wear can be suppressed. That is, in the block pattern, normally the trailing side of the block 20, that is, the area near the trailing end side in the tire rotation direction, readily slips at the time of kickoff of the block 20. Further, the trailing side significantly wears compared to the leading side of the block 20, readily causing so-called heal and toe wear. In contrast, in the pneumatic tire 1 according to the present embodiment, the small blocks 40 positioned on the trailing side of the lateral narrow groove 31 in the tire rotation direction have a greater surface area than the small blocks 40 positioned on the leading side, and thus the small blocks 40 positioned on the trailing side of the lateral narrow groove 31 have high block rigidity compared to that of the small blocks 40 positioned on the leading side. In this way, at the time of kickoff of the block 20, movement of the small block 40 positioned on the trailing side in the tire rotation direction can be decreased and a susceptibility to slippage on the road surface can be reduced, making it possible to suppress wear caused by the small block 40 moving and slipping on the road surface. As a result, it is possible to improve uneven wear resistance and reduce noise while maintaining performance on snow and ice.

Further, the plurality of intermediate blocks 43 of the blocks 20 each have a greater surface area than those of the leading-side block 41 and the trailing-side block 42, and thus the total surface area of the plurality of small blocks 40 positioned in the periphery of an intersection portion where the circumferential main groove 10 and the lug groove 15 intersect can be made close in size among different intersections portions. In other words, at least one block 20 adjacent to the intersection portion is configured so that the leading-side block 41 or the trailing-side block 42 is positioned in the periphery of the intersection portion between the circumferential main groove 10 and the lug groove 15, and the other blocks 20 are configured so that the intermediate blocks 43 are positioned on the intersection portion side. As a result, the intermediate blocks 43 of the blocks 20 each have a greater surface area than those of the leading-side block 41 and the trailing-side block 42, and thus the total surface area of the plurality of small blocks 40 surrounding an intersection portion between the circumferential main groove 10 and the lug groove 15 can be made close in size among different intersection portions. Accordingly, between the plurality of intersection portions of the circumferential main groove 10 and the lug groove 15, each ground contact patch pressure when the plurality of small blocks 40 positioned in the periphery of the intersection portion contact the ground can be configured to be about the same, making it possible to suppress uneven wear caused by differences in ground contact patch pressure. As a result, uneven wear resistance can be more reliably improved.

Further, the narrow groove 30 has the groove depth d within the range from $0.05 \leq (d/D) \leq 0.3$ with respect to the groove depth D of the circumferential main groove 10, making it possible to more reliably suppress uneven wear while reducing the hitting sound when the block 20 contacts the ground. In other words, when the relationship between the groove depth d of the narrow groove 30 and the groove depth D of the circumferential main groove 10 is $(d/D) < 0.05$, the groove depth d of the narrow groove 30 is too small, making it difficult to appropriately divide the small blocks 40. In this case, when the blocks 20 contact the ground, the small blocks 40 may interconnect and contact the ground across a large surface area, possibly causing difficulties in reducing the hitting sound at the time of ground contact by the blocks 20. Further, when the relationship between the groove depth d of the narrow groove 30 and the groove depth D of the circumferential main groove 10 is (d/D)>0.3, the groove depth d of the narrow groove 30 is too large, possibly causing the rigidity of the small blocks 40 defined by the narrow grooves 30 to be too low, which may make the rigidity of the small blocks 40 too low, causing uneven wear. In contrast, when the relationship between the groove depth d of the narrow groove 30 and the groove depth D of the circumferential main groove 10 is within the range from 0.05≤(d/D)≤0.3, the small blocks 40 can be appropriately divided, making it possible to suppress uneven wear caused by an excessively low rigidity of the small blocks 40 while reducing the hitting sound at the time of ground contact by the blocks 20. As a result, it is possible to more reliably improve uneven wear resistance and reduce noise.

Further, in the narrow grooves 30, the distance L1 in the tire circumferential direction from the portion of the block 20 positioned on the frontmost side in the tire rotation direction to the opening portion 34 that opens to the circumferential main groove 10 of the tire equator line CL side is within the range from 0.2≤(L1/L)≤0.5 with respect to the length L of the block 20 in the tire circumferential direction, making it possible to more reliably suppress the occurrence of block breakage while reducing the hitting sound at the time of ground contact by the blocks 20. In other words, when the relationship between the distance from the leading end of the block 20 in the tire rotation direction to the opening portion 34 of the narrow groove 30 and the length L of the block 20 in the tire circumferential direction is (L1/L)<0.2, the length of the portion of the block 20 positioned on the leading side in the tire rotation direction from the opening portion 34 is too short, causing the block rigidity of this portion to be too low, possibly resulting in block breakage caused by stress concentration. Further, when the relationship between the distance from the leading end of the block 20 in the tire rotation direction to the opening portion 34 of the narrow groove 30 and the length L of the block 20 in the tire circumferential direction is (L1/L)<0.5, difficulties may arise in deceasing the surface area of the leading-side block 41, and thus effectively reducing the hitting sound at the time of ground contact by the leading-side blocks 41. In contrast, when the relationship between the distance from the leading end of the block 20 in the tire rotation direction to the opening portion 34 of the narrow groove 30 and the length L of the block 20 in the tire circumferential direction is 0.2≤(L1/L)≤0.5, block breakage on the leading side of the block 20 in the tire rotation direction and the hitting sound at the time of ground contact by the leading-side blocks 41 can be effectively reduced. As a result, it is possible to more reliably improve uneven wear resistance and reduce noise.

Further, the groove depths of the lateral narrow groove 31 and the circumferential narrow grooves 32 of the narrow grooves 30 are mutually different, making it possible to appropriately set relative rigidities between the small blocks 40 in accordance with relative disposed positions. As a result, it is possible to more reliably improve uneven wear resistance and reduce noise while maintaining performance on snow and ice.

Further, the lateral narrow groove 31 opens to the circumferential main grooves 10 on both ends, and the circumferential narrow groove 32 opens to the lug groove 15 on one end and the lateral narrow groove 31 on the other end, making it possible to dispose the circumferential narrow groove 32 in a preferred position in the tire lateral direction. In this way, the relative size of the surface area of each of the small blocks 40 can be set to a desired size. As a result, it is possible to more reliably improve uneven wear resistance and reduce noise while maintaining performance on snow and ice.

Further, the groove depth d1 of the lateral narrow groove 31 is greater than the groove depth d2 of the circumferential narrow groove 32, making it possible to increase the edge effect in the tire rotation direction by the lateral narrow groove 31 and more reliably improve traction performance when running on icy and snowy road surfaces. As a result, performance on snow and ice can be more reliably improved.

Further, among the plurality of small blocks 40 of the block 20, the small block 40 adjacent to the lug groove 15 defining the leading side of the block 20 in the tire rotation direction includes the groove wall 16 on the lug groove 15 side that is inclined in a direction that causes the groove width of the lug groove 15 to decrease as the groove wall 16 extends from the opening portion 18 side toward the groove bottom 17 of the lug groove 15, making it possible to ensure rigidity at the time of tread-in of the block 20. As a result, breakage of the block 20 can be suppressed, making it possible to improve durability.

Further, the blocks 20 are each provided with the chamfer 19 on each of the end portions on the tread surface 3 side of the groove walls 16 of the lug grooves 15 defining both sides in the tire circumferential direction, making it possible to suppress a concentration of stress in the edge portions 21 of the block 20 in the tire circumferential direction and suppress breakage of the block 20 at the time of tread-in and kick-off from the road surface of the block 20. As a result, durability can be more reliably improved.

Further, the circumferential main groove 10 is formed into a zigzag shape that repeatedly oscillates in the tire lateral direction while extending in the tire circumferential direction, making air compressed by sound less likely to flow into the circumferential main groove 10 even when a hitting sound is produced at the time of ground contact by the blocks 20, thereby reducing the volume of the sound that flows outside the ground contact surface. As a result, noise can be more reliably reduced.

Figure 5:
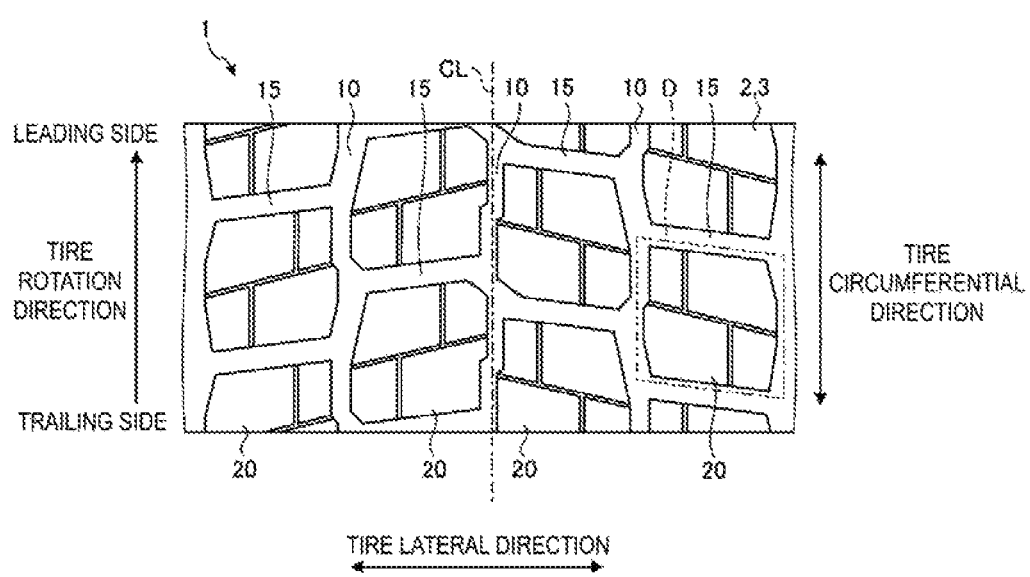
FIG. 5 is a modified example of the pneumatic tire according to the embodiment, and is an explanatory diagram of a case where a lateral narrow groove is not provided with a bent portion.
Figure 6:
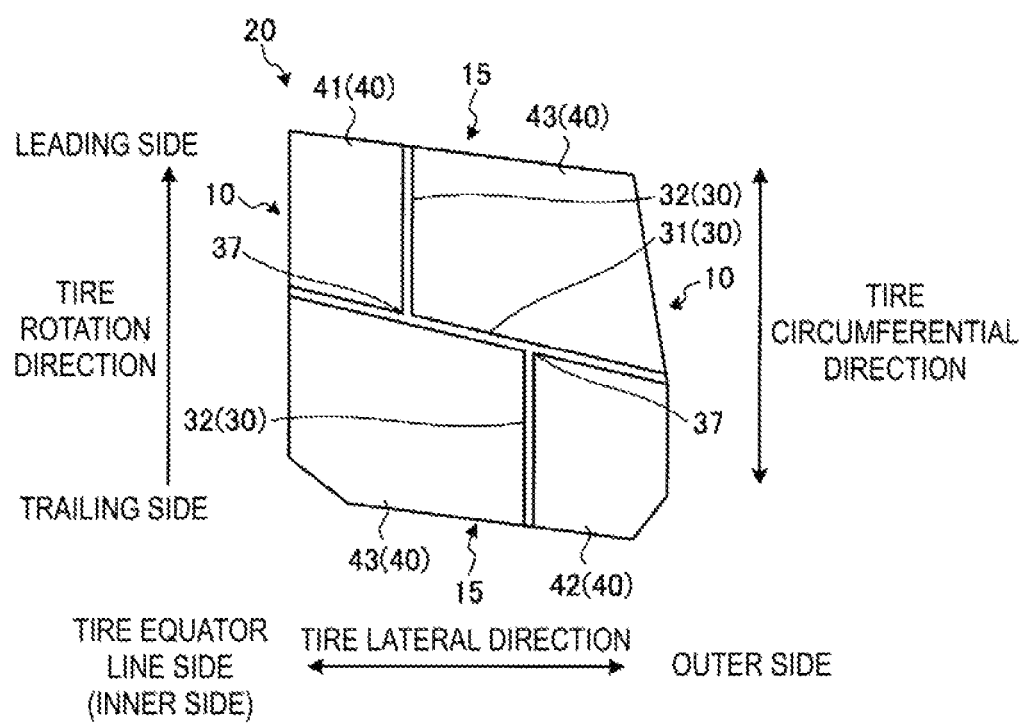
FIG. 6 is a detailed view of part D of FIG. 5.

Note that while, in the pneumatic tire 1 according to the embodiment described above, the lateral narrow groove 31 formed in the block 20 includes the bent portions 35, the lateral narrow groove 31 does not need to include the bent portions 35. FIG. 5 is a modified example of the pneumatic tire according to the embodiment, and is an explanatory diagram of a case where the lateral narrow groove is not provided with a bent portion. FIG. 6 is a detailed view of part D of FIG. 5. The lateral narrow groove 31, as illustrated in FIGS. 5 and 6, for example, may be linearly formed between the circumferential main grooves 10 positioned on both sides of the block 20 in the tire lateral direction. Even when the lateral narrow groove 31 does not include the bent portion 35, as long as the blocks 20 are defined into the plurality of small blocks 40 by the circumferential narrow groove 32 making, among the plurality of small blocks 40, the leading-side block 41 have the smallest surface area and the intermediate block 43 have a greater surface area than those of the leading-side block 41 and the trailing-side block 42, the shape of the lateral narrow groove 31 is not limited.

Figure 7:
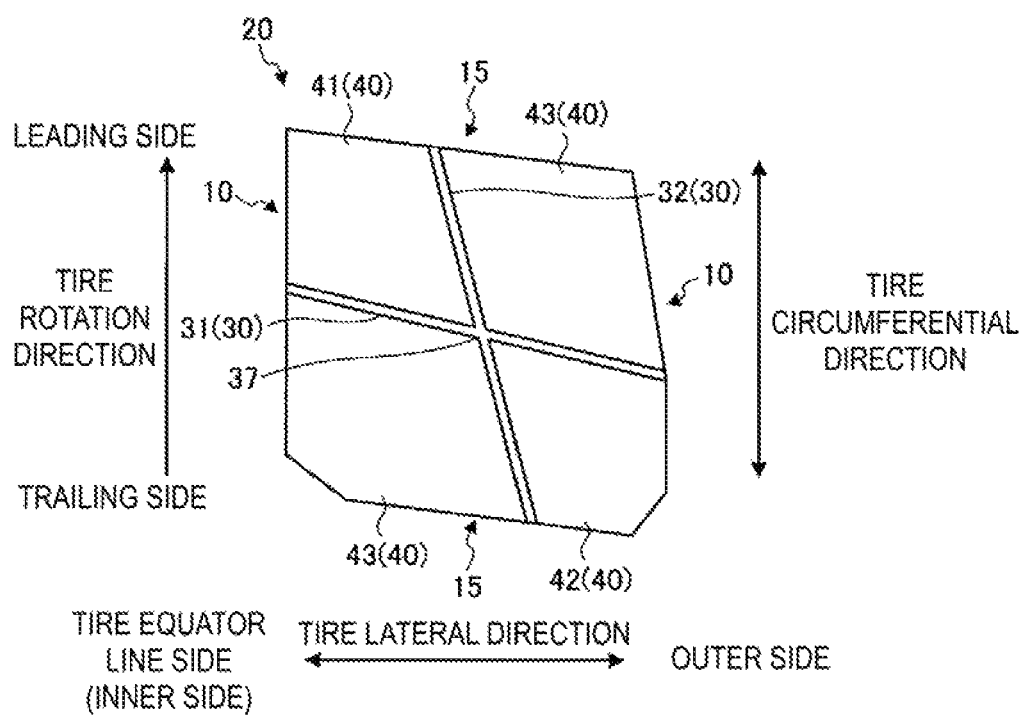
FIG. 7 is a modified example of the pneumatic tire according to the embodiment, and is an explanatory diagram of a case where the number of intersection points is other than two.

Further, while in the pneumatic tire 1 according to the embodiment described above, two circumferential narrow grooves 32 are connected to the lateral narrow groove 31 at the two intersection points 37, the number of intersection points between the circumferential narrow groove 32 and the lateral narrow groove 31 does not need to be two. FIG. 7 is a modified example of the pneumatic tire according to the present embodiment, and is an explanatory diagram of a case where the number of intersection points is other than two. The number of the intersection points 37 between the circumferential narrow groove 32 and the lateral narrow groove 31 may be one, for example, as illustrated in FIG. 7. That is, one lateral narrow groove 31 may be formed across the two circumferential main grooves 10 that define the block 20 in the tire lateral direction, and one circumferential narrow groove 32 may be formed across the two lug grooves 15 that define the block 20 in the tire circumferential direction, thereby intersecting the lateral narrow groove 31 at the one intersection point 37. The number of the intersection points 37 between the circumferential narrow groove 32 and the lateral narrow groove 31 may be other than two as long as the block 20 is defined into three or more small blocks 40.

Figure 8:
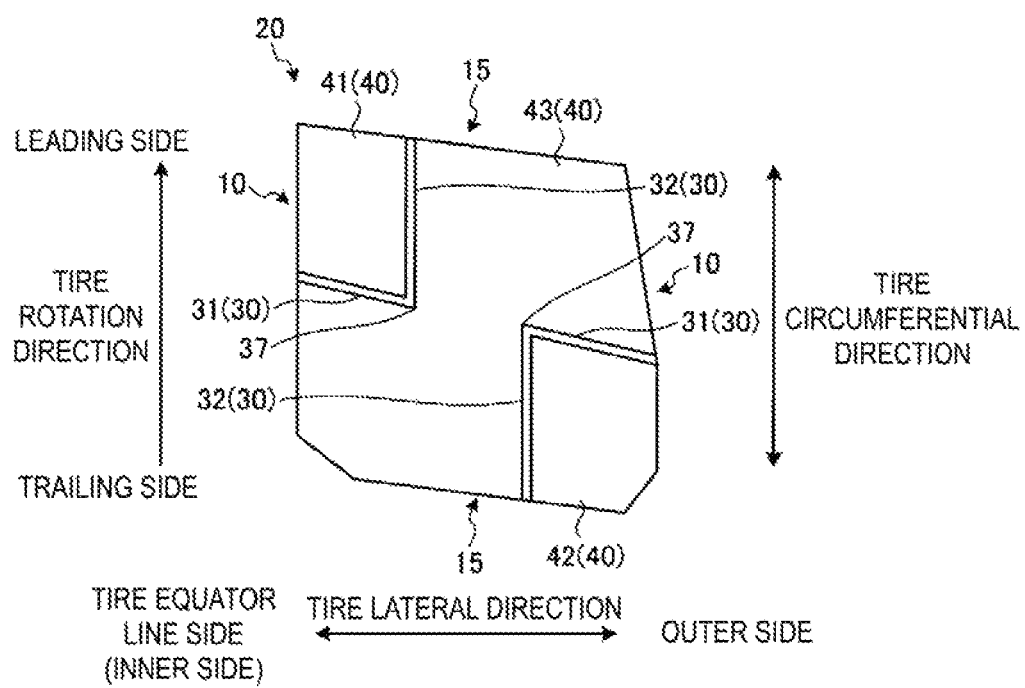
FIG. 8 is a modified example of the pneumatic tire according to the embodiment, and is an explanatory diagram of a case where the number of small blocks is other than four.

Further, while in the pneumatic tire 1 according to the embodiment described above, each of the blocks 20 is defined into the four small blocks 40, the number of the small blocks 40 formed in the one block 20 may be other than four. FIG. 8 is a modified example of the pneumatic tire according to the embodiment, and is an explanatory diagram of a case where the number of small blocks is other than four. The number of small blocks 40 formed in each of the blocks 20 may be three, for example, as illustrated in FIG. 8. The number of small blocks 40 formed in each of the blocks 20 may be three or more, and the shape of the small blocks 40 may be a shape other than rectangular as in the intermediate block 43 illustrated in FIG. 8.

Further, the lateral narrow groove 31 does not need to open to both circumferential main grooves 10 that define both sides of one block 20 in the tire lateral direction, and the circumferential narrow groove 32 does not need to open to both lug grooves 15 that define both sides of the block 20 in the tire circumferential direction. For example, as illustrated in FIG. 8, one lateral narrow groove 31 may simply open to one circumferential main groove 10, and one circumferential narrow groove 32 may simply open to one lug groove 15. The narrow groove 30 does not need to be formed across from one end side to the other end side of the block 20 in the tire lateral direction or the tire circumferential direction as long as one block 20 is defined into three or more small blocks 40.

Figure 9:
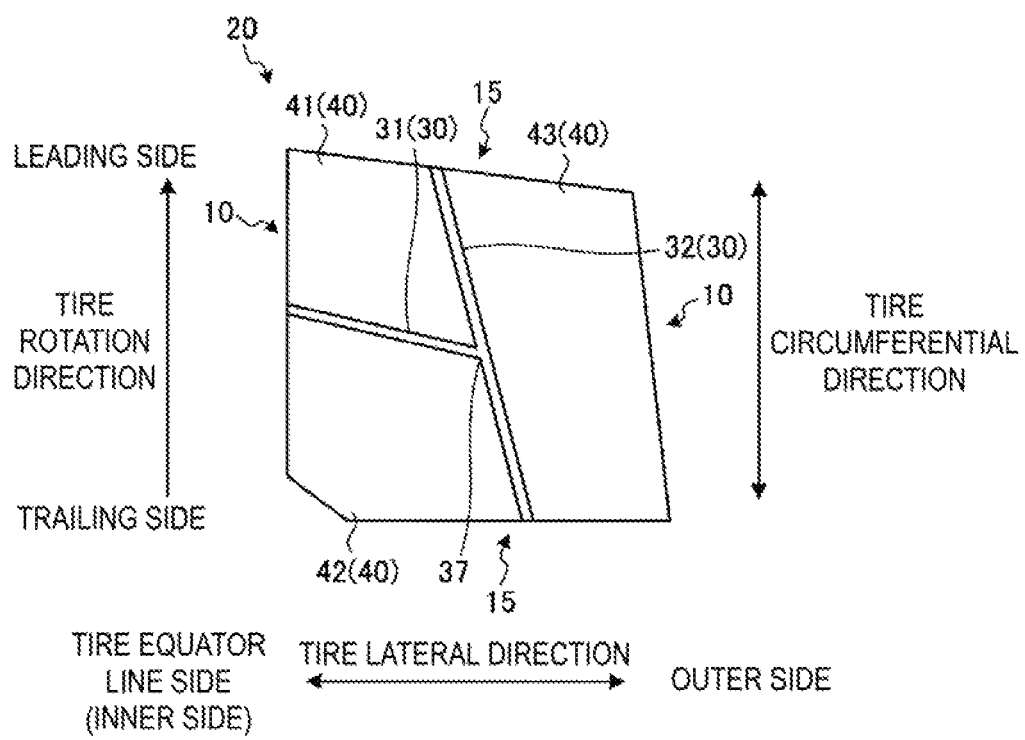
FIG. 9 is a modified example of the pneumatic tire according to the embodiment, and is an explanatory diagram of a case where the trailing-side block is disposed in a position other than the outer side in the tire lateral direction.

Further, while in the pneumatic tire 1 according to the embodiment described above, the trailing-side block 42 is disposed in a position adjacent to the circumferential main groove 10 that defines the outer side of the block 20 in the tire lateral direction, the trailing-side block 42 may be disposed in a position other that this in the block 20. FIG. 9 is a modified example of the pneumatic tire according to the embodiment, and is an explanatory diagram of a case where the trailing-side block is disposed in a position other than the outer side in the tire lateral direction. The trailing-side block 42, for example, may be adjacent to the lug groove 15 that defines the trailing side of the block 20 in the tire rotation direction, and to the circumferential main groove 10 that defines the tire equator line CL side of the block 20 in the tire rotation direction, as illustrated in FIG. 9. The trailing-side block 42 may be in any position in the tire lateral direction as long as the trailing side block 42 is formed so as to include a back end of the block 20 in the tire rotation direction.

Further, while in the pneumatic tire 1 according to the embodiment described above, the narrow grooves 30 are configured so that the groove depth d1 of the lateral narrow groove 31 is greater than the groove depth d2 of the circumferential narrow groove 32, the groove depth d2 of the circumferential narrow groove 32 may be greater than the groove depth d1 of the lateral narrow groove 31. Further, the groove depth of the narrow groove 30 may differ for each of the blocks 20, and may be formed at three or more depths within each of the blocks 20. Further, the narrow grooves 30 may be configured so that, for example, the lateral narrow groove 31 is a regular groove in which the groove walls are continuously spaced apart even when the block 20 contacts the ground, and the circumferential narrow groove 32 may be formed by a sipe or the like, resulting in a mixture of regular groove and sipes.

Thus, as long as the narrow grooves 30 define the blocks 20 into three or more small blocks 40, making the surface area of the trailing-side block 42 greater than the surface area of the leading-side block 41, and the surface area of the intermediate block 43 greater than the surface areas of the leading-side block 41 and the trailing-side block 42, the presence or absence of the bent portion 35, the number of intersection points 37, the number of defined small blocks 40, the form of the narrow groove 30 itself, and the like are not limited.

EXAMPLES

FIGS. 10A and 10B are tables showing the results of performance tests of pneumatic tires. In relation to the pneumatic tire 1 described above, performance evaluation tests conducted on a pneumatic tire of a conventional example, the pneumatic tire 1 according to the present technology, and pneumatic tire of a comparative example that is to be compared to the pneumatic tire 1 according to the present technology are described below. The performance evaluation tests were conducted on pass-by noise performance which is the performance of noise produced in association with the rolling of the pneumatic tire 1, uneven wear performance which is the performance of the uneven wear characteristics of the tread surface 3, and traction performance during running on icy and snowy road surfaces.

The performance evaluation tests were conducted by mounting the pneumatic tire 1 having a size of 315/70R22.5 defined by ETRTO on a regular rim, adjusting the air pressure to 900 kPa, mounting the tire onto a 2-D test vehicle, and then running tests. The evaluation method of each test item was as follows. That is, pass-by noise performance was evaluated on the basis of the measured volume of exterior pass-by noise in accordance with a tire noise test method defined in ECE (Economic Commission for Europe) Regulation No. 117 Revision 2 (ECE R117-02). In this test, the test vehicle run from an area at a sufficient distance in front of a noise measurement section, the engine was stopped immediately in front of the section, and a maximum noise level dB (noise level within a frequency range of from 800 to 1200 Hz) in the noise measurement section during coasting was measured at a plurality of speeds obtained by substantially equally dividing a speed range into eight or more intervals of ±10 km/h with respect to a standard speed, and setting the average as the exterior pass-by noise. The maximum noise level dB is a sound pressure dB (A) measured through an A-characteristic frequency correction circuit using a stationary microphone installed 7.5 m laterally from a run center line at an intermediate point in the noise measurement section and at a height of 1.2 m from the road surface. Pass-by noise performance is expressed based on the measurement result by using Conventional Example described later as an index value of 100. A larger index value indicates a smaller sound pressure dB, that is, a smaller pass-by noise, and thus greater level of excellence in pass-by noise performance.

Further, uneven wear performance was evaluated by visually evaluating uneven wear, specifically heal and toe wear, of the tread surface 3 after conducting a 100000-km road test in the test vehicle. Uneven wear performance is expressed by using the evaluation result of Conventional Example described later as an index value of 100. A larger index value indicates a smaller degree of uneven wear and thus a greater degree of excellence in uneven wear performance. Further, traction performance was evaluated by evaluating acceleration performance on snow under the test conditions defined in UNECE (United Nations Economic Commission for Europe) Regulation No. 117 Revision 2 (ECE R117-02). Traction performance is expressed by using the evaluation result of Conventional Example described later as an index value of 100. A larger index value indicates better acceleration performance on snow and a greater degree of excellence in traction performance.

Performance evaluation tests were conducted on 13 pneumatic tires, namely a pneumatic tire of Conventional Example, which is one example of the pneumatic tire 1 in the related art, Examples 1 to 11 which are the pneumatic tires 1 according to the present technology, and Comparative Example which is a pneumatic tire that is to be compared to the pneumatic tire 1 according to the present technology. Of these pneumatic tires 1, in the pneumatic tire of Conventional Example, the circumferential main groove 10 does not form a zigzag shape, and the surface areas of the small blocks 40 are not configured so as to form the relationship leading-side block 41<trailing side block 42<intermediate block 43. Further, in the pneumatic tire of Comparative Example, the circumferential main groove 10 forms a zigzag shape, but the surface areas of the small blocks 40 are not configured so as to form the relationship leading-side block 41<trailing side block 42<intermediate block 43.

Further, in the Examples 1 to 11 serving as examples of the pneumatic tire 1 according to the present technology, the circumferential main groove 10 forms a zigzag shape, and the surface areas of the small blocks 40 are configured so as to form the relationship leading-side block 41<trailing side block 42<intermediate block 43. Further, in the pneumatic tires 1 according to Examples 1 to 11, the depths of the narrow groove 30 with respect to that of the circumferential main grooves 10, the position of the opening portion 34 of the lateral narrow groove 31 with respect to the length of the block 20, whether the narrow grooves 30 have two or more types of groove depths, whether the groove wall 16 of the lug groove 15 defining the leading side of the block 20 in the tire rotation direction is inclined, and the presence or absence of the chamfer 19 of the lug groove 15 are each different.

As shown in FIGS. 10A and 10B, the results of the evaluation tests conducted using these pneumatic tires 1 indicate that the pneumatic tires 1 of the Examples 1 to 11 can improve pass-by noise performance, uneven wear performance, and traction performance in contrast to Conventional Example and Comparative Example. That is, the pneumatic tires 1 according to Examples 1 to 11 can improve uneven wear resistance and reduce noise while maintaining traction performance on snow and ice.

The invention claimed is:

1. A pneumatic tire having a specified rotation direction, comprising:
   a tread surface;
   a plurality of circumferential main grooves formed on the tread surface and extending in a tire circumferential direction;
   a plurality of lug grooves formed on the tread surface and extending in a tire lateral direction; and
   a plurality of blocks wherein both sides of each of the plurality of blocks are defined by the lug grooves in the tire circumferential direction and at least one end portion of each of the plurality of blocks are defined by the circumferential main grooves in the tire lateral direction,
   the lug grooves each being configured with at least a portion thereof that defines a leading side of each of the plurality of blocks in a tire rotation direction inclined toward a trailing side in the tire rotation direction as that portion extends outward in a tire lateral direction from a tire equator line side,
   the plurality of blocks each comprising a narrow groove that opens to at least one of the circumferential main grooves and at least one of the lug grooves,
   each of the plurality of blocks being defined into three or more small blocks by the narrow groove,
   the plurality of small blocks being configured such that, among the plurality of small blocks, a first small block adjacent to a leading side lug groove of the plurality of lug grooves defining the leading side of the block in the tire rotation direction and to an equator side circumferential main groove of the plurality of circumferential main grooves defining the tire equator line side of one block of the plurality of blocks in the tire lateral direction is a leading-side block with a portion thereof positioned on a frontmost side of the one block in the tire rotation direction,
   among the plurality of small blocks, a second small block with a portion thereof positioned on a backmost side of the one block in the tire rotation direction being a trailing-side block, and a third small block other than the leading-side block and the trailing-side block being an intermediate block, and
   the plurality of small blocks being configured such that the trailing-side block has a surface area greater than that of the leading-side block, and the intermediate block has a surface area greater than that of the trailing-side block, wherein
   the plurality of blocks each comprises a plurality of the intermediate blocks, and
   the narrow groove comprises:
     a lateral narrow groove that extends in the tire lateral direction and opens to the one of the circumferential main grooves on at least one end, and
     a plurality of circumferential narrow grooves that extend in the tire circumferential direction from the lateral narrow groove to the lug grooves defining the one block, the plurality of circumferential narrow grooves extending straightly without bending.

2. The pneumatic tire according to claim 1, wherein the plurality of intermediate blocks each have a surface area greater than those of the leading-side block and the trailing-side block.

3. The pneumatic tire according to claim 2, wherein the narrow groove has a groove depth d within a range from $0.05 \leq (d/D) \leq 0.3$ with respect to a groove depth D of the one of the circumferential main grooves.

4. The pneumatic tire according to claim 3, wherein
a distance L1 in the tire circumferential direction from a portion positioned on the frontmost side of the block in the tire rotation direction to an opening portion that opens to the one of the circumferential main grooves is within a range from $0.2 \leq (L1/L) \leq 0.5$ with respect to a length L of the one block in the tire circumferential direction.

5. The pneumatic tire according to claim 4, wherein
the lateral narrow groove and the circumferential narrow groove having mutually different groove depths.

6. The pneumatic tire according to claim 5, wherein the lateral narrow groove has a groove depth greater than the groove depth of the circumferential narrow grooves.

7. The pneumatic tire according to claim 6, wherein the plurality of small blocks are configured such that, among the plurality of small blocks, the first small block adjacent to the one of the lug grooves defining the leading side of the one block in the tire rotation direction comprises a groove wall on a lug groove side that is inclined in a direction that causes a groove width of the one of the lug grooves to decrease as the groove wall extends from an opening portion side toward a groove bottom of the one of the lug grooves.

8. The pneumatic tire according to claim 7, wherein the blocks are each provided with a chamfer on each end portion on a tread surface side of the groove walls of the lug grooves defining both sides in the tire circumferential direction.

9. The pneumatic tire according to claim 4, wherein the lateral narrow groove opens to the circumferential main grooves on both ends.

10. The pneumatic tire according to claim 9, wherein the lateral narrow groove has a groove depth greater than the groove depth of the circumferential narrow grooves.

11. The pneumatic tire according to claim 10, wherein the plurality of small blocks are configured such that, among the plurality of small blocks, the first small block adjacent to the one of the lug grooves defining the leading side of the one block in the tire rotation direction comprises a groove wall on a lug groove side that is inclined in a direction that causes a groove width of the one of the lug grooves to decrease as the groove wall extends from an opening portion side toward a groove bottom of the one of the lug grooves.

12. The pneumatic tire according to claim 11, wherein the blocks are each provided with a chamfer on each end portion on a tread surface side of the groove walls of the lug grooves defining both sides in the tire circumferential direction.

13. The pneumatic tire according to claim 1, wherein the narrow groove has a groove depth d within a range from $0.05 \leq (d/D) \leq 0.3$ with respect to a groove depth D of the one of the circumferential main grooves.

14. The pneumatic tire according to claim 1, wherein
the narrow groove opens to the one of the circumferential main grooves, the one of the circumferential main grooves being the equator side circumferential main groove defining the tire equator line side of the block in the tire lateral direction, and
a distance L1 in the tire circumferential direction from a portion positioned on the frontmost side of the block in the tire rotation direction to an opening portion that opens to the one of the circumferential main grooves is within a range from $0.2 \leq (L1/L) \leq 0.5$ with respect to a length L of the one block in the tire circumferential direction.

15. The pneumatic tire according to claim 1, wherein
the lateral narrow groove and the circumferential narrow grooves have mutually different groove depths.

16. The pneumatic tire according to claim 15, wherein the lateral narrow groove has a groove depth greater than the groove depth of the circumferential narrow grooves.

17. The pneumatic tire according to claim 1, wherein
the lateral narrow groove opens to the circumferential main grooves on both ends.

18. The pneumatic tire according to claim 1, wherein the plurality of small blocks are configured such that, among the plurality of small blocks, the first small block adjacent to the one of the lug grooves defining the leading side of the one block in the tire rotation direction comprises a groove wall on a lug groove side that is inclined in a direction that causes a groove width of the one of the lug grooves to decrease as the groove wall extends from an opening portion side toward a groove bottom of the one of the lug grooves.

19. The pneumatic tire according to claim 1, wherein the blocks are each provided with a chamfer on each end portion on a tread surface side of groove walls of the lug grooves defining both sides in the tire circumferential direction.

* * * * *